United States Patent
Murray

(10) Patent No.: US 6,405,019 B1
(45) Date of Patent: *Jun. 11, 2002

(54) METHOD AND APPARATUS FOR CONTROLLING A PERFORMANCE CHARACTERISTIC OF AN ELECTRONIC DEVICE

(75) Inventor: Matthew Justin Murray, Raleigh, NC (US)

(73) Assignee: Ericsson, Inc., RTP, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,726

(22) Filed: Jun. 30, 1998

(51) Int. Cl.[7] .......................... H04B 17/00; H04M 3/00; H03G 5/00
(52) U.S. Cl. .................... 455/67.1; 455/419; 381/103
(58) Field of Search ................ 455/254, 67.1, 455/67.2, 419, 418, 420; 381/150, 337, 1–3, 334; 379/433.03

(56) References Cited

U.S. PATENT DOCUMENTS

| | | | | |
|---|---|---|---|---|
| 4,631,749 A | * | 12/1986 | Rapaqich | 381/103 |
| 5,120,943 A | * | 6/1992 | Benz | 235/375 |
| 5,201,063 A | * | 4/1993 | Tam et al. | 455/115 |
| 5,274,319 A | * | 12/1993 | Keener et al. | 320/2 |
| 5,381,148 A | * | 1/1995 | Mueck et al. | 341/139 |
| 5,731,992 A | | 3/1998 | Torregrossa | |
| 5,732,331 A | * | 3/1998 | Harms | 455/351 |
| 5,777,341 A | * | 7/1998 | Seiwatz et al. | 250/474.1 |
| 5,832,079 A | * | 11/1998 | Rabe | 379/433 |
| 5,852,769 A | * | 12/1998 | Ahmed et al. | 455/115 |
| 5,890,057 A | * | 3/1999 | Dutkiewicz et al. | 455/226.1 |
| 5,890,072 A | * | 3/1999 | Rabe | 455/550 |
| 5,994,770 A | * | 11/1999 | Harrington et al. | 257/579 |
| 6,091,938 A | * | 7/2000 | Go | 455/90 |
| 6,091,964 A | * | 7/2000 | Frohlund | 455/550 |

FOREIGN PATENT DOCUMENTS

| | | | |
|---|---|---|---|
| DE | 34 36 696 | 4/1986 | |
| DE | 41 40 585 | 6/1993 | |
| EP | 165 058 | * 12/1985 | ............ H04M/1/72 |
| EP | 275996 | * 7/1988 | |
| EP | 0 376 666 | 7/1990 | |
| EP | 0 420 508 | 4/1991 | |
| WO | 97/42726 | * 11/1997 | |

* cited by examiner

*Primary Examiner*—Vivian Chin
*Assistant Examiner*—Charles N. Appiah
(74) *Attorney, Agent, or Firm*—Moore & Van Allen, PLLC; Steven B. Phillips

(57) ABSTRACT

A method and apparatus are provided for controlling a performance characteristic of an electronic device. In one form, the electronic device includes a frame, a first subassembly on the frame and including a component encoded with a measured value of a first performance characteristic of the first subassembly, a download circuit on the frame to download the measured value from the encoded component, and an electronic circuit on the frame to a) receive a signal from the download circuit representative of the measured value and b) control a second performance characteristic of the electronic device as a function of the signal. In one form, the method includes the steps of measuring a value of a first performance characteristic of a first subassembly of an electronic device, encoding a component with the value, assembling the first subassembly to the electronic device, downloading the value from the component, and controlling a second performance characteristic of the electronic device as a function of the downloaded value.

14 Claims, 2 Drawing Sheets of an electronic device within a desired performance range. The method includes the steps of measuring a value of a first performance characteristic of a first subassembly of an electronic device, encoding a component with the value, assembling the first subassembly to the electronic device, downloading the value from the component, and controlling a second performance characteristic of the electronic device within a desired performance range as a function of the downloaded value.

METHOD AND APPARATUS FOR CONTROLLING A PERFORMANCE CHARACTERISTIC OF AN ELECTRONIC DEVICE

FIELD OF THE INVENTION

This invention relates to electronic devices, and more particularly, to electronic devices, such as mobile phones, having a performance characteristic, such as a transmission gain, which has a selectable optimal performance range or value.

BACKGROUND OF THE INVENTION

It is common for electronic devices to have one or more performance characteristics which have a desired performance range or value. For example, it is often desirable to control the transmission gain of the speech or audio signal of mobile phones within a predetermined range to provide an acoustic level for the transmission path that is acceptable for the intended operating environment of the mobile phones. The performance range or value of the transmission gain can be particularly critical to the actual and perceived performance of the mobile phone in urban areas having relatively high levels of background noise.

In mobile phones employing a flip that includes a passive acoustic channel or a transducer, such as a microphone, the transmission gain is a function of both the transmitter circuitry in the main housing of the mobile phone and the sensitivity level of the transducer and associated circuitry in the flip or, in the case of an acoustic channel, the mechanical seal of the acoustic channel and the absence of obstructions in the channel. One approach to obtaining the desired performance range for the transmission gain in such mobile phones is to preset the gain circuitry of the phones to a level that assumes nominal values for the sensitivity levels of the electronic components, such as the microphone, in the transmission path or, in the case of an acoustic channel, the nominal value for the acoustic gain of the acoustic channel. However, this approach does not address variations in the sensitivity levels or acoustic gain from one component to the next component, which can result in a transmission gain of the speech signal that varies by up to 6 dB from one mobile phone to the next. Another approach is to set the transmission gain by performing audio transmission level trim after the flip has been mounted to the remainder of the mobile phone. However, this approach may increase the cost and complexity of assembling such phones.

SUMMARY OF THE INVENTION

In accordance with the present invention, an electronic device includes a frame, a first subassembly on the frame and including a component encoded with a measured value of a first performance characteristic of the first subassembly, a download circuit on the frame to download the measured value from the encoded component, and an electronic circuit on the frame to a) receive a signal from the download circuit representative of the measured value and b) control a second performance characteristic of the electronic device as a function of the signal.

In one form, the first performance characteristic is different from the second performance characteristic.

In one form, the electronic device further includes a transmitter on the frame. The first subassembly includes a transducer circuit operably associated with the transmitter. The measured value is the sensitivity level of the transducer circuit, and the second performance characteristic is a transmission gain through the transmitter and the transducer circuit.

In one form, the electronic device further includes a transmitter on the frame. The first subassembly includes an acoustic channel operably associated with the transmitter. The measured value is the acoustic gain of the acoustic channel, and the second performance characteristic is a transmission gain through the transmitter and the acoustic channel.

In accordance with one form of the present invention, a mobile phone includes a frame; a transmitter on the frame; a flip assembly on the frame and including a transducer circuit operably associated with the transmitter, and a component encoded with a measured value of a sensitivity level of the transducer circuit; a download circuit on the frame to download the measured value from the encoded component; and an electronic circuit on the frame to a) receive a signal from the download circuit representative of the measured value and b) control a transmission gain through the transmitter and the transducer circuit as a function of the signal.

In accordance with one form of the present invention, a mobile phone includes a frame; a transmitter on the frame; a flip assembly on the frame and including an acoustic channel operably associated with the transmitter, and a component encoded with a measured value of an acoustic gain of the acoustic channel; a download circuit on the frame to download the measured value from the encoded component; and an electronic circuit on the frame to a) receive a signal from the download circuit representative of the measured value and b) control a transmission gain through the transmitter and the transducer circuit as a function of the signal.

In one form, the electronic circuit controls the second performance characteristic of the electronic device within a desired performance range as a function of the signal.

In one form, the encoded component includes a magnetic strip, and the download circuit includes a magnetic strip reader.

In one form, the encoded component includes a bar code, and the download circuit includes a bar code scanner.

In one form, the encoded component includes a memory chip, and the download circuit includes circuitry to access the memory chip to download the encoded value from the memory chip.

In accordance with one form of the present invention, a method is provided for setting a performance characteristic of an electronic device within a desired performance range. The method includes the steps of measuring a value of a first performance characteristic of a first subassembly of an electronic device, encoding a component with the value, assembling the first subassembly to the electronic device, downloading the value from the component, and controlling a second performance characteristic of the electronic device within a desired performance range as a function of the downloaded value.

In one form, the controlling step includes controlling the second performance characteristic of the electronic device within a desired performance range as a function of the downloaded value.

In one form of the invention, the encoding step includes encoding a component on the first subassembly with the value.

In one form of the invention the downloading step occurs after the assembling step.

In one form of the invention the downloading step precedes the assembling step.

In one form, the downloading step includes the step of powering on the electronic device.

In accordance with one form of the present invention, a method is provided for setting a transmission gain of a mobile phone including a main housing, a transmitter on the housing, and a flip. The flip includes a transducer circuit. The method includes the steps of measuring a value of a sensitivity level of the transducer circuit in the flip, encoding the value in a component on the flip, assembling the flip onto the main housing, downloading the value from the component, and controlling a transmission gain of the mobile phone as a function of the downloaded value.

In accordance with one form of the present invention, a method is provided for sending the transmission gain of the mobile phone in the main housing, transmitter on the housing, and a flip. The flip includes an acoustic channel. The method includes the steps of measuring a value of an acoustic gain of the acoustic channel and flip, encoding the value in a component on the flip, assembling the flip onto the main housing, downloading the value from the component, and controlling a transmission gain of the mobile phone as a function of the downloaded value.

In one form, the downloading step includes the step of powering on the mobile phone.

DETAILED DESCRIPTION OF THE PREFERRED EMBODIMENTS

Figure 1:
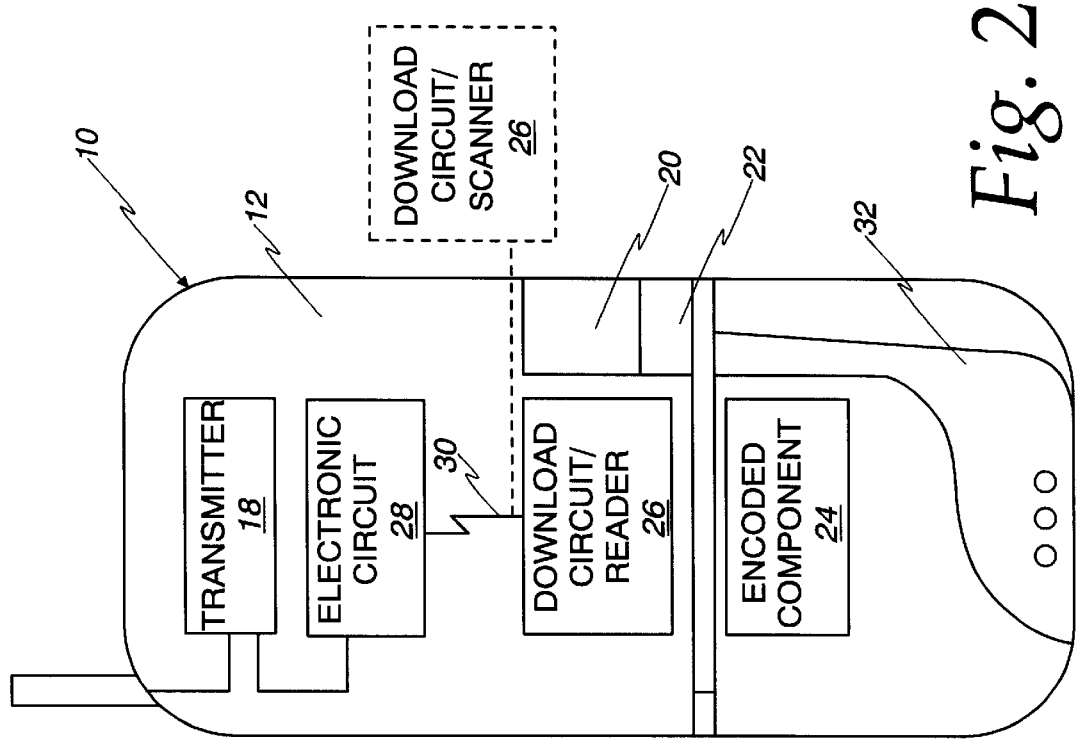
FIG. 1 is a diagrammatic plan view of an electronic device in the form of a mobile phone embodying the present invention.

An exemplary embodiment of an electronic device 10, made according to the invention, is described herein and illustrated in the drawings in the form of a mobile cellular phone 10. However, it should be understood that the invention may find utility in other applications and is not limited to use in a mobile cellular telephone.

With reference to FIG. 1, the mobile phone 10 includes a frame in the form of a main housing 12, a first subassembly in the form of a flip 14 pivotably mounted on the housing 12 by a hinge 16, and a transmitter, shown generally at 18, mounted on the housing 12. The flip 14 includes a transducer circuit, shown generally at 20, which in turn includes a transducer in the form of a microphone 22. The flip 14 also includes a component 24 associated with, and preferably mounted on, the flip 14 and encoded with a measured value of a first performance characteristic in the form of the sensitivity level of the transducer circuit 20 of the flip 14.

The phone 10 further includes a download circuit 26 mounted on the housing 12 to download the value from the encoded component 24, and an electronic circuit, shown generally at 28, mounted on the housing 12 to a) receive a signal 30 from the download circuit 26 representative of the downloaded value and b) control a second performance characteristic in the form of the transmission gain of the phone 10 within a desired performance range or value as a function of the signal 30.

Many types of encoded components 24 and download circuits 26 are well known in the art and may be utilized to practice the invention. For example, in one embodiment of the invention, the encoded component 24 includes a magnetic strip encoded with the measured value of the sensitivity of the flip 14 level and the download circuit 26 includes a magnetic strip reader. By way of further example, in another embodiment of the invention, the encoded component 24 includes a memory chip encoded with the measured value of the sensitivity level of the flip 14, and the download circuit 26 includes circuitry for accessing the memory chip to download the measured value from the memory chip.

Preferably, the electronic circuit 28 is provided in the form of programmable gain control circuitry, which is well known in the art. However, any type of electronic circuit 28 that can receive a signal 30 and control a second performance characteristic of an electronic device, such as a transmission gain of the phone 10, as a function of the signal 30, may be utilized to practice the invention. Accordingly, a more detailed description of the electronic circuit 28 is not required.

Similarly, because there are many types of housings 12, flips 14, hinges 16, transmitters 18, transducer circuits 20, and transducers 22 that are well known in the art and that may be utilized to practice the invention, a more detailed description of these components is not required.

Figure 2:
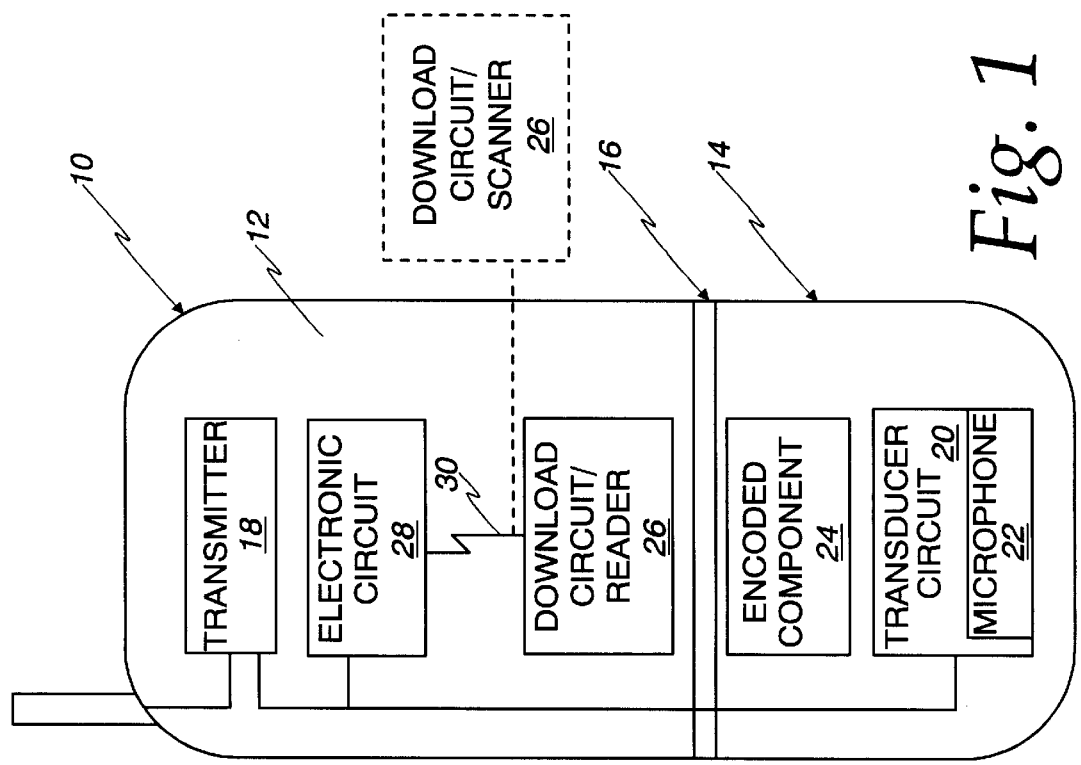
FIG. 2 is a diagrammatic plan view of another mobile phone embodying the present invention.

FIG. 2 shows another embodiment of the invention in the form of a mobile phone that is identical to the mobile phone shown in FIG. 1 except that the transducer circuitry 20 and transducer 22 are located in the housing 12 rather than in the flip 14, which includes a passive acoustic channel 32 rather than a transducer circuit 20 and transducer 22. The acoustic gain of the flip 14 shown in FIG. 2 is a function of the mechanical seal of the acoustic channel 32 and the absence of obstructions in the channel 32. The encoded component 24 is encoded with a measured value of a first performance characteristic in the form of the acoustic gain of the acoustic channel 32 of the flip 14.

Figure 3:
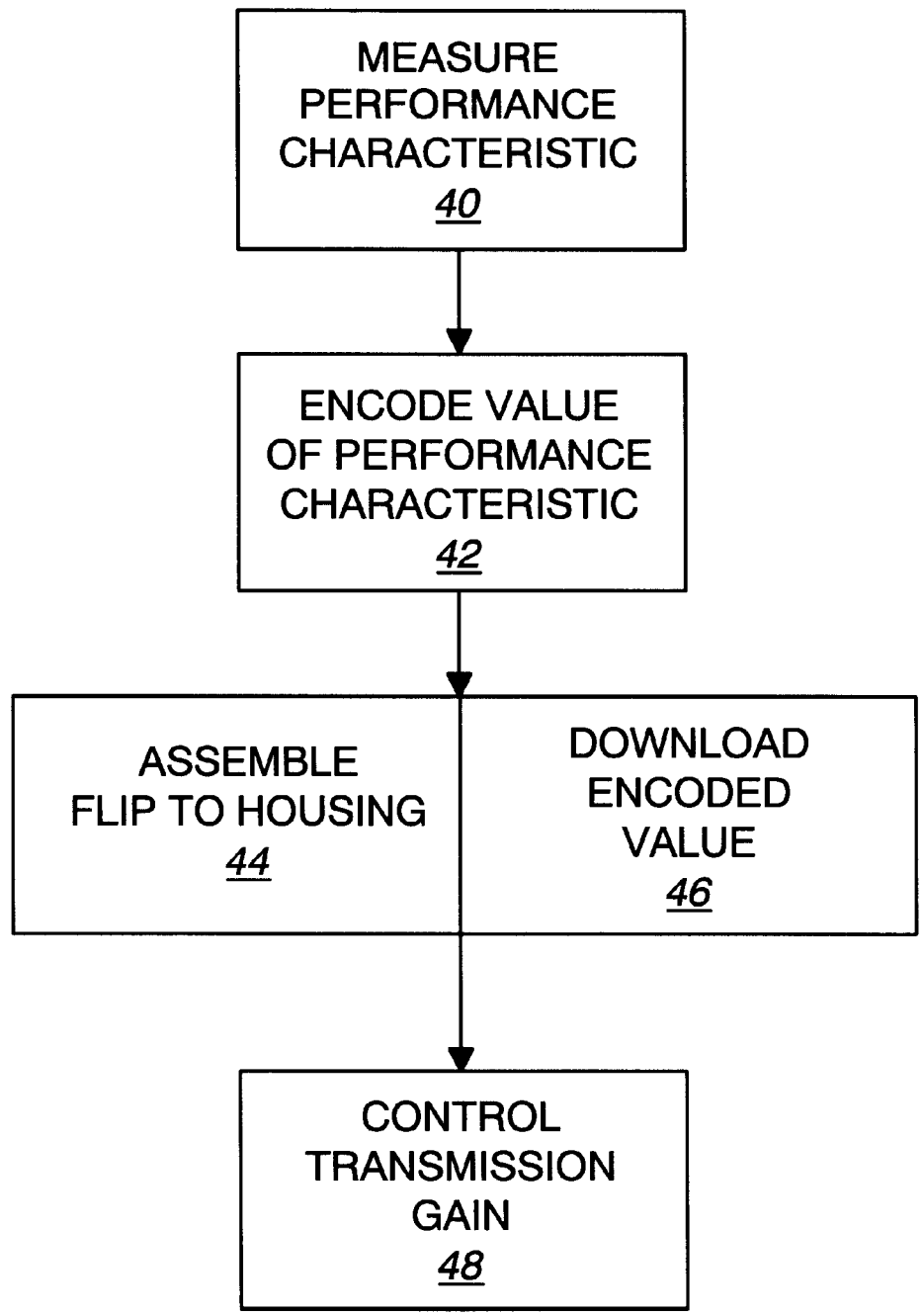
FIG. 3 is a flow chart illustrating a method embodying the present invention.

The method of the invention may best be understood with reference to the flow diagram illustrated in FIG. 3. As shown at blocks 40 and 42, the sensitivity level or acoustic gain is measured for the flip 14, and then the measured value of the sensitivity level or acoustic gain is encoded in the component 24 associated with, and preferably on, the flip 14. Next, as shown at blocks 44 and 46, the flip 14 is assembled to the main housing 12 of the phone 10 which includes the transmitter 18 and the electronic circuit 28 with a preset gain level, and the encoded value is downloaded from the component 24. Finally, as shown at block 48, the electronic circuit 28 controls the transmission gain of the phone 10 by either a) maintaining the preset gain level in the phone 10 if the preset gain level provides the desired performance range for the transmission gain based on the downloaded value, or b) if the preset level does not provide the desired performance range for the transmission gain based on the downloaded value, resetting the gain level to achieve the desired performance range.

It is anticipated that the method of the invention will be utilized for the mass production of phones 10. In such mass production, the steps of blocks 40 and 42 may be performed on a plurality of flips 14 prior to the steps of blocks 44, 46, and 48 to improve the production efficiency.

According to one preferred embodiment of the method, the assembling step of block 44 precedes the downloading step of block 46, and the downloading step of block 46 includes the step of powering on the phone 10 to initialize the downloading of the encoded value.

According to another embodiment of the invention, the phone 10 does not include a download circuit 26 mounted on the housing 12. Rather, as shown by the phantom in FIG. 1 and FIG. 2, the download circuit 26 is provided in the form of a bar code scanner that may be independent of the phone, and the encoded component 24 includes a bar code encoded with the measured value of the sensitivity level or acoustic gain of the flip 14. With this embodiment of the phone 10, the downloading step of block 46 includes scanning the bar code of the encoded component 10, processing the downloaded value through a programmable computer that may be independent of the phone 10 to determine the appropriate gain level for the phone 10, and uploading a command from the independent computer to the phone 10 that will direct the electronic circuit to provide the appropriate gain level for the phone 10. For this embodiment, the assembling step of block 44 may precede the downloading step of block 46, or the downloading step of block 46 may precede the assembling step of block 44, or the assembling and downloading steps of blocks 44 and 46 may occur essentially simultaneously.

The foregoing disclosure of specific embodiments is intended to be illustrative of the broad concepts comprehended by the invention.

What is claimed is:

1. An electronic device comprising:
   a frame;
   a transmitter on the frame;
   a flip assembly connected to the frame and comprising a passive acoustic channel and a component encoded with a measured value of the acoustic gain of the passive acoustic channel, wherein the acoustic gain is a function of the mechanical seal of the passive acoustic channel and the absence of obstructions in the passive acoustic channel;
   a download circuit on the frame to download the measured value from the encoded component; and
   an electronic circuit on the frame to a) receive a signal from the download circuit representative of the measured value and b) control a performance characteristic of the electronic device as a function of the signal, wherein the performance characteristic is a transmission gain through the transmitter.

2. The electronic device of claim 1 wherein the encoded component comprises a magnetic strip, and the download circuit comprises a magnetic strip reader.

3. The electronic device of claim 1 wherein the encoded component comprises a bar code, and the download circuit comprises a bar code scanner.

4. A mobile phone comprising:
   a frame;
   a transmitter on the frame;
   a flip assembly connected to the frame and comprising a passive acoustic channel operably associated with the transmitter, and a component encoded with a measured value of an acoustic gain of the passive acoustic channel, wherein the acoustic gain is a function of the mechanical seal of the passive acoustic channel and the absence of obstructions in the passive acoustic channel;
   a download circuit on the frame to download the measured value from the encoded component; and
   an electronic circuit on the frame to a) receive a signal from the download circuit representative of the measured value and b) control a transmission gain through the transmitter within a desired performance range as a function of the signal.

5. The mobile phone of claim 4 wherein the encoded component comprises a magnetic strip, and the download circuit comprises a magnetic strip reader.

6. The mobile phone of claim 4 wherein the encoded component comprises a bar code, and the reader comprises the bar code scanner.

7. The mobile phone of claim 4 wherein the encoded component comprises a memory chip, and the download circuit comprises circuitry to download the encoded value from the memory chip.

8. A method of setting a transmission gain of a mobile phone including a main housing, a transmitter on the housing, and a flip, the flip including a passive acoustic channel, the method comprising the steps of:
   determining a measured value for an acoustic gain of the passive acoustic channel in the flip, wherein the acoustic gain is a function of the mechanical seal of the passive acoustic channel and the absence of obstructions in the passive acoustic channel;
   encoding a component with the measured value;
   assembling the flip onto the main housing of the electronic device;
   downloading the measured value from the encoded component; and
   using the measured value from the encoded component to control a transmission gain of the mobile phone as a function of the measured value from the encoded component.

9. The method of claim 8 wherein the downloading step comprises the step of powering on the mobile phone.

10. The method of claim 8 wherein the downloading step occurs after the assembling step.

11. A mobile phone comprising:
    a housing;
    a transmitter;
    a flip assembly pivotably mounted on the housing and including a passive acoustic channel for receiving an acoustic signal;
    an encoded component connected to the flip assembly including a value of the acoustic gain of the passive acoustic channel measured during production of the flip assembly, wherein the acoustic gain is a function of the mechanical seal of the passive acoustic channel and the absence of obstructions in the passive acoustic channel;
    a transducer connected to the housing for receiving an acoustic signal from the passive acoustic channel; and
    an electronic circuit connected to the download circuit and transducer to receive the measured value and control a performance characteristic of the mobile phone as a function of the measured value, wherein the performance characteristic is a transmission gain through the transmitter.

12. The mobile phone of claim 11 wherein the encoded component includes a magnetic strip, and the electronic circuit includes a magnetic strip reader.

13. The mobile phone of claim 11 wherein the encoded component comprises a bar code, and the electronic circuit includes a bar code scanner.

14. The mobile phone of claim 11 wherein the encoded component includes a memory chip, and the electronic circuit includes a circuitry to download the encoded value from the memory chip.

* * * * *